United States Patent [19]

Matsumura et al.

[11] 4,244,814
[45] Jan. 13, 1981

[54] FLOSS SEPARATOR

[75] Inventors: Kunihiko Matsumura; Mitsuyoshi Fukauchi; Motoki Iizuka; Yumitoyo Utsunomiya, all of Ichiharashi, Japan

[73] Assignee: Chisso Corporation, Osaka, Japan

[21] Appl. No.: 38,889

[22] Filed: May 14, 1979

[51] Int. Cl.$^3$ .............................................. B04C 3/00
[52] U.S. Cl. ..................................... 209/144; 55/416
[58] Field of Search ................. 209/144, 211; 55/416; 210/512 R, 512 M

[56] References Cited

U.S. PATENT DOCUMENTS

| | | | |
|---|---|---|---|
| 2,711,247 | 6/1955 | Hills | 209/144 X |
| 2,730,193 | 1/1956 | Hoyle | 55/416 X |
| 3,315,445 | 4/1967 | Seversky | 55/416 X |

Primary Examiner—William A. Cuchlinski, Jr.
Attorney, Agent, or Firm—Fred Philpitt

[57] ABSTRACT

When a thermoplastic resin pellet is transported by air current, a floss is formed in pellet in a slight amount, which is flake-like or string-like and causes various troubles in the subsequent operations.

A floss separator having a small size, a light weight and a superior floss-separation efficiency is provided.

This separator consists mainly of a lower cylindrical column and an upper cylindrical chamber connected thereto, and further a specific inlet for introducing a mixture of air or nitrogen gas with a floss-containing pellet into the column and for imparting to the mixture, a helical ascending gas current, and baffles fixed onto the inner wall of the column at the upper end part thereof and counter-radially protruded therefrom, and having a specified angle of attack and a specified swept-back angle to the gas current line of the gas mixture, and also having a blow-through part formed by said baffles and the upper end part of the column. Pellet falls and separates at the baffles, while floss together with the gas pass therethrough.

6 Claims, 6 Drawing Figures

FLOSS SEPARATOR

DESCRIPTION OF THE INVENTION

The present invention relates to a floss separator having a compact, integrated and simple construction.

Floss referred to herein means a fine, thin, flake-like or thin, slender, string-like thermoplastic resin formed when pellet of a thermoplastic resin produced according to a known method is transported with a gas current.

As for the method for producing pellet of thermoplastic resins, a method of cutting an extruded sheet or strand of thermoplastic resins has been widely employed, and pellet formed by cutting of strand is cooled down to a temperature at which no mutual melt-adhesion thereof occurs, and transported to a storage part. Cooling of said pellet is carried out by air or water-cooling, and in case of water-cooling, drying is then carried out. In either of the cases, fine powder or waste formed at the time of cutting strand by means of a high speed cutter is removed by applying a gas current thereto. Pellet is then sent to a hopper by means of a gas current transportation, and during the transportation, a string-like material or a flat tail-like material is often formed on the pellet in a gas current-transporting pipe, or a part of pellets often turn to a leaf-like material as a whole. In the present invention, such a pellet having a string-like or tail-like material, such a leaf-like material and the like are referred to as "floss". In this invention, it is intended to separate such a floss from regular form pellets, by means of a floss separator provided at the final end of said gas current-transporting pipe.

Since the end part of the gas current-transporting pipe for pellet is in most cases located on a hopper for pellet, it is preferable that the floss separator is of a small type and light weight so that too large a load is not applied onto the hopper.

For separating pellet carried by gas current from the gas (which may be air in most cases) constituting the gas current, a method of leading the gas current-transporting pipe directly to the space above the hopper for pellet may be considered, but according to such a method, floss enters the hopper along with pellet. On the other hand, if a conventional cyclone is employed as a gas-solid separator, pellet is collected together with floss, while if a powder-classifying cyclone is employed, floss is caught in a fine powder-withdrawing port and this floss mixes in pellets at the time of stop of operation. If the size of cyclone is made larger, it is possible to cause the performance as separator to come close to that of a classifier, but it is impossible to obtain a separator of small type and light weight as aimed in the present invention. If separators employing a rotor or a guide blade are employed, floss is caught by the rotor, the blade or their support, and floss mixes into pellet at the time of finish of operation. Further if a classifier as in wind force classifier wherein a mixture of pellet with air is fed from upward, an air current is separately caused to flow from downward, and air alone is separated to the lateral side, is employed, then floss often mixes into pellet, or pellet also escapes from the classifier. Further, since floss is formed at the time of gas current-transportation of pellet irrespective of the transporting speed, the above-mentioned known methods have encountered difficulties in dropping pellet alone into the hopper or preventing escape of pellet out of the classifier.

In view of the above-mentioned problems of the known methods, the object of the present invention is to provide an apparatus which has a simple structure; has a small size and light weight; does not require any additional power means; and yet can separate floss from pellet.

The floss separator of the present invention resides in:

(1) A floss separator consisting mainly of a vertical type lower cylindrical column and a cylindrical upper chamber connected directly to the upper part of said column and having a larger diameter than that of said column and an exit of a gas current at the upper part thereof;

said vertical type lower cylindrical column having (a) an inlet pipe fixed onto the lower outer surface of said column and laterally thereto, for causing a mixture of air or nitrogen gas with a thermoplastic resin pellet to flow into said column through the inlet and also forming a helical ascending gas current of said mixture in said column, (b) a discharging port provided below said exit, for discharging a thermoplastic resin pellet separated from said mixture, and (c) a blow-through part for gas current formed by a plurality of baffles fixed onto the inner wall of said column at the uppermost part thereof, and the upper end part of said column, (d) said plurality of baffles
 (i) being counter-radially protruded from the inner wall of said column toward the axis of said column, respectively, and
 (ii) each having an angle of attack of 0.20 to 90° to the current line of said helical ascending gas current, and also
 (iii) a sweptback angle of 0° to 30° to said gas current line at the lower margin of said baffles,
 (iv) at least the tip ends of two or more of said baffles partly overlapping with each other on a plan view of said blow-through part.

Further the present invention is also characterized by the following embodiments (2) ∼ (6):

(2) A floss separator according to the above-mentioned item 1 wherein said mixture of air or nitrogen with a thermoplastic resin pellet has a mixing ratio by volume of 3:1 to 300:1.

(3) A floss separator according to the above-mentioned item 1 wherein the number of said plurality of baffles is 2 to 32.

(4) A floss separator according to the above-mentioned item 1 1 wherein the ratio of the area of said blow-through part in the horizontal cross-section of said column on the level of the upper end of said blow-through part, to the area of said horizontal cross-section is 0.1 to 0.9.

(5) A floss separator according to the above-mentioned item (1) wherein the axis of said inlet has an upward angle of 3° to 30°.

(6) A floss separator according to the above-mentioned item (1) wherein the horizontal component of the axial line of said inlet is tangential to the horizontal cross-section of said column.

The present invention will be concretely described referring to the accompanying drawings.

Figure 1:
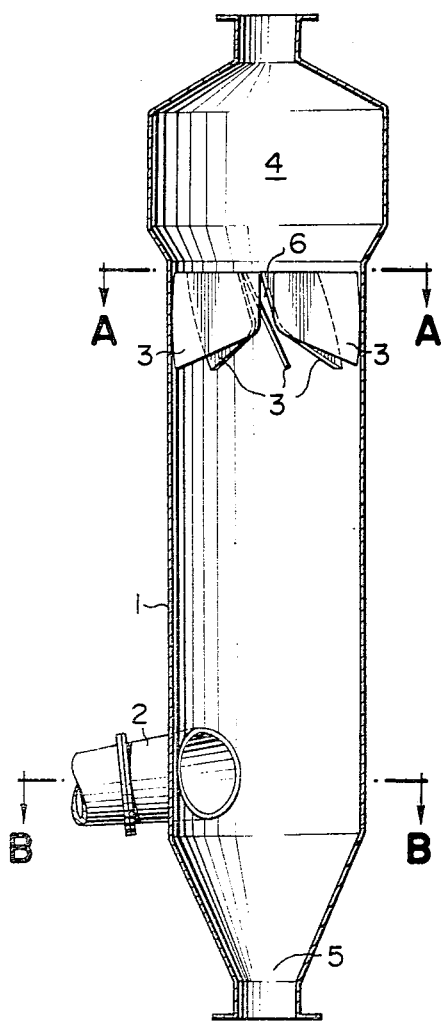
FIG. 1 shows a cross-sectional view of a floss separator of the present invention taken along the longitudinal center line thereof.

In FIG. 1, numeral 1 shows a lower cylindrical column; 2, an inlet through which a gas-solid mixture containing floss is introduced; 3, baffles; 4, an upper chamber; 5, a lower discharging port; and 6, a blow-through part. In this figure, with regard to baffles, only those fixed onto both the right and left inner side surfaces are shown in the total shape, respectively, but others are omitted.

Figure 2:
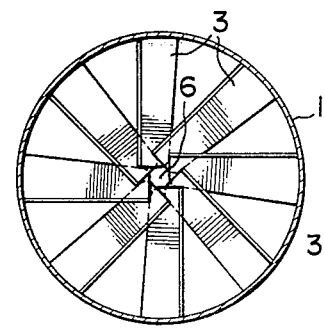
FIG. 2 shows a plan view of a blow-through part formed by a group of baffles 3 and a lower cylindrical column 1, in the cross-section taken along line A—A.
Figure 3:
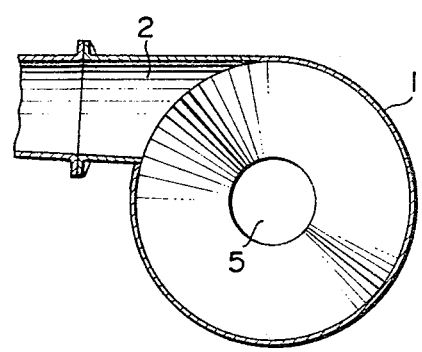
FIG. 3 shows a schematic view of the cross section of FIG. 1 taken along line B—B.

In FIG. 2, numeral 1 shows a lower cylindrical column; 3, baffles; and 6, a blow-through part, as in FIG. 1. In this figure, inlet 2 shown in FIG. 1 is omitted.

Figure 4A:
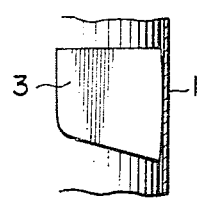
FIGS. 4a, 4b and 4c show an enlarged view of three shape modifications of baffles 3 shown in FIG. 1, respectively.
Figure 4B:
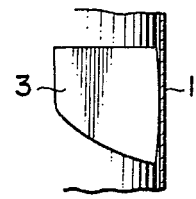
Figure 4C:
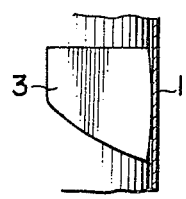

In FIGS. 4a, 4b and 4c, numeral 1 shows a lower cylindrical column and numeral 3 shows a baffle. In these figures, the shapes of baffle 3 are varied from that shown in FIG. 1.

As seen in FIG. 1, the inlet 2 is fixed onto the lower outer surface of column 1 in the direction along the outer surface thereof, whereby it is intended to sufficiently develop the helical ascending current of a gas-solid mixture inside the lower cylindrical column 1, depending on the shape and the direction of the axial line of the inlet. Further the flow-in direction of the inlet 2 is directed upwards at an angle of 3° to 30° to the horizontal line inside the column 1, whereby it is intended that floss cannot be carried downwards. Inside the cylindrical column 1, some pellets separate from the helical ascending current and fall downwards, while others are carried upwards along with the helical ascending current. Thus, at the uppermost part of the column 1 are provided a group of baffles 3, where pellets are separated from the helical ascending current. As for the shapes of the lower cylindrical column 1 and the upper chamber 4, although it is possible to employ an upward extended conical type column, besides a right cylindrical type column, a right cylindrical column can be easily manufactured and may be sufficient.

Next, the constitution and effectiveness of the present invention will be described.

The lower cylindrical column referred to herein is a vertical cylinder, which is connected directly to the upper chamber at the upper end thereof. A mixture of air or nitrogen gas with a thermoplastic resin pellet from which floss is to be separated, is fed into the lower cylindrical column through an inlet provided on the lower outer surface of the column and laterally thereto, by means of a blower. It is preferable that the vertical component of the axial line of this inlet be directed upwards at an angle of 3° to 30°, preferably 5° to 20° to the horizontal cross-section of the lower cylindrical column, and also the horizontal component of said axial line be directed tangentially to said horizontal cross-section, since a preferable helical ascending current is obtained by taking such directions of the axial line. The ratio by volume of gas to solid of the mixture of air or nitrogen gas with a thermoplastic resin pellet is 3:1 to 300:1, preferably 10:1 to 100:1. At the lowermost part of the lower cylindrical column is formed an exit for a thermoplastic resin pellet separated from the mixture and freed of floss, which exit is preferably so constructed that it takes an inverted frustum form whereby the part is easily connected with a conveying pipe or a hopper or the like to be connected therewith, and is provided with a flange at the lower end thereof. Further, inside the uppermost part of the lower cylindrical column are provided 2 to 32, preferably 4 to 16 blade-form baffles counter-radially protruded from the inner wall of the column toward the central axis thereof. As for the manner in which these baffles are protruded from the inner wall of the column, the angle of the blade-form baffles to the current line of the helical ascending current mentioned below is made 0° to 90°, preferably 10° to 80° in terms of an angle of attack to said current line. In this case, it is necessary that the respective baffles are partly overlapping with two or more other mutually adjacent baffles, at least at their tip ends of the baffles on the plan view of the baffles, and these baffles form a blow-through part containing the central axis of the column without intercepting the central axis (the blow-through part will be hereinafter referred to as central blow-through part). Beside this central blow-through part, there are a plurality of blow-through parts formed between the inner wall of the lower cylindrical column and two mutually adjacent baffles, in the form of Δ as seen on the plan view of the baffles (these blow-through parts will be hereinafter referred to as circumferential blow-through parts). The ratio of the total area of these central and circumferential blow-through parts on the plan view thereof to the cross-sectional area of the lower cylindrical column on the plan view thereof is 0.1 to 0.9, preferably 0.2 to 0.8. With regard to this ratio, if the current of gas-solid mixture mentioned below, i.e. the helical ascending current has a relatively high flow rate, it is possible to make the ratio higher e.g. 0.5 to 0.8, since the group of baffles has a large separation effect upon the solid i.e. pellet, while if the flow rate is relatively low to the contrary, it is possible to make the ratio lower e.g. 0.2 to 0.4.

Further this ratio is adjusted mainly by the area of the central blow-through part, since the area of the circumferential blow-through parts depends on the shape of baffles and the distance between the locations of adjacent protruded baffles, and hence the number of baffles. With regard to the angle of the current line of the helical ascending current in the upward direction, on the assumption that this angle is the same as the angle of the axial line of the inlet in the upward direction, as defined in the above-mentioned item (5), an angle exceeding 90° is undesirable since the floss separation effect of the floss separator of the present invention is much lowered.

The group of the baffles 3, as shown in FIGS. 1 and 2, are provided so as to be protruded from the inner wall of the uppermost of the lower cylindrical column toward the axial line of the column. For causing the helical ascending current to collide with the baffles, it is necessary that the surface of the baffles 3 has an angle of attack to the current line of the helical ascending current. It is preferable that the respective lower margins of the baffles have a sweptback angle of 0° to 30° to the direction of the above-mentioned current line. Pellet having collided with the baffles drops downwards, while floss having collided with the baffles is carried to the upper chamber 4 by the gas current without dropping downwards, or a part of floss is caught in the lower margin of the baffles. However, if such a part of floss remains caught in the lower margin of the baffles 3 as it is, the caught floss drops and mixes in pellet at the time of completion of gas-current transportation. Thus, in the present invention, it is preferable that the above-mentioned sweptback angle to the colliding gas current is provided in the lower margin of the baffles to thereby cause the floss caught in the lower margin to successively slip off from the lower margin of the baffles. The sweptback shape of the lower margin of baffles 3 may be a shape wherein the lower margin is straight, or a shape wherein it is varied at a plurality of stages so that the sweptback angle increases as the lower margin comes closer to the axial line of the cylindrical column 1, or a shape forming a curve such as arc. In addition, particularly as for the tip end of the lower margin of baffles 3, it is preferable to process the flat shape into an arculate form as shown in FIGS. 4a, 4b and 4c to thereby make the slip-off of floss easy. The baffles may be an utterly flat plate or a curved plate or a twisted plate having a twist angle varied between the tip end and the fixed part.

At the uppermost part of the lower cylindrical column 1, it is important that the group of baffles 3 counterradially provided there, are so constructed that a central blow-through part is formed about the axial line of the lower cylindrical column 1 as apparent from FIG. 2; neither stanchion nor reinforcing material is provided at the blow-through part so that floss is not caught therein or adhered thereto; and slip-off of floss caught in the lower margin of baffles 3 smoothly occurs.

The pellet and floss entrained on the helical ascending gas current and ascending through the inside of the lower cylindrical column 1 are distributed mostly at the part near to the inner wall of the lower cylindrical column 1 due to their centrifugal force. Thus, in order to cause pellet and floss to collide with baffles 3 at the part near to the inner wall of the column 1, according to the present invention, baffles 3 are protruded from the inner wall of the lower cylindrical column 1, and a blow-through part is formed only at one part surrounding the axial line of the lower cylindrical column 1 whereby sufficient separation of floss from pellet has become possible. On the contrary if a stanchion is provided at the axial line part of the lower cylindrical column 1 and baffles are protruded radially from the stanchion to thereby provide a circular blow-through part near to the inner wall of the lower cylindrical column 1, the effectiveness of the present invention cannot be obtained. However, the presence of blow-through parts having a figure Δ on a plan view, formed by the inner wall and the baffles at the circumferential part of the cylinder does not hinder the effectiveness of the present invention.

Above the group of baffles 3 is provided an upper chamber 4 having a larger diameter, whereby the flow rate of the gas current is reduced, and a further separation of floss from pellet by gravity is carried out. As mentioned above, in the present invention, by counter-radially protruding the group of baffles 3, it is possible to impart a sufficient effectiveness for not causing pellet to escape through the blow-through part i.e. upwards from the location of the group of baffles 3. The gas current having passed through the part of baffles is still yet whirling. Thus if the upper chamber is constructed so as to have a circular horizontal cross-section and also an axial line common with that of the lower cylindrical column 1, it is possible to smoothly lead the gas current to the upper cylindrical chamber. Further if the diameter of the lower cylindrical column is made larger and the ascending angle of the helical ascending gas current is as small as e.g. 3° to 10°, it is not always necessary to make the diameter of the upper chamber 4 larger than that of the lower cylindrical column. As for the surface of the inner wall of the upper chamber 4, it is preferable that the surface is freed of burr formed at the time of constructing the chamber, baffles fixed thereto, etc. to thereby prevent floss from being caught therein. It is also possible to provide a withdrawing part of pellet and floss in the upper chamber, if necessary. If the upper part of the upper chamber is made conical so that floss can be easily withdrawn, and the flow-out opening is provided at the center of the upper part, then whirling of the gas current inside the upper chamber is not influenced so much, and hence a good result is obtained The present invention will be further described by way of Examples but is not intended to be limited thereby.

EXAMPLES 1-3

Polypropylene pellet before floss separation in amounts shown in Table 1 described below was separated employing the floss separator of the present invention (the upwards directed angle at the feeding part: 10°, the number of baffles: 8, and the angle of attack formed between baffles and the current line of helical ascending current: 50°), and the resulting separated to-be-separated materials such as floss or the like (a string-like material Ⓐ, a flakelike powder Ⓑ and pellet Ⓒ which accompanied these materials) and a string-like floss contained in pellet after floss separation (a string-like portion Ⓓ caught in a 1 mesh metal gauze, and a string-like portion Ⓔ mixed in product) were analyzed.

TABLE 1

| | | Floss separation from polypropylene pellet | | | | | |
|---|---|---|---|---|---|---|---|
| | | To-be-separated material in separator | | | String like floss in pellet after separation | | |
| | | A | B | | D | E | Seperation |
| | (Treated amount (ton) | String-like floss (g) | Flake-like floss (g) | C Pellet (Kg) | Portion caught in 1 mesh metal gauze (g) | Portion mixed in pellet product (g) | efficiency (A + B) × 100 / A + B + D + E % |
| No. 1 | (77) | 106 | 102 | 1.9 | 16 | 15 | 87.0 |
| No. 2 | (80) | 150 | 97 | 0.9 | 30.5 | 15 | 84.4 |
| No. 3 | (76) | 144 | 247 | 1.1 | 19 | 15 | 92.0 |

As described above, it is possible to separate a very small amount of floss contained in a very large amount of pellet therefrom, by means of the floss separator of the present invention having a simple structure, without requiring a secondary air and with a separation efficiency of 80% to 90% or 90% or higher. Further it is possible to prevent various troubles before, at and after the time of pellet production, for example, (i) a trouble at the time of air-transporting pellet not yet subjected to floss-separation, where it is impossible to transport pellet on account of clogging of the lower part of cyclone caused by the presence of string-like floss, and (ii) a trouble at the time of packaging pellet not yet subjected to floss-separation, into bags, wherein packaging speed is lowered on account of a string-like floss caught in a 1 mesh metal gauze as a final filter for the packaging. Further, (iii) at the time of molding polypropylene pellet, it is possible to prevent variance of the amount of scraped pellet caused by string-like floss caught in the scraper of a table feeder. Still further, (iv) it is possible to prevent clogging of a string-like floss in the feed line filter for feeding polypropylene pellet into extruder or the like. Furthermore, (v) it is also possible to inhibit dust explosion or danger of ignition at the time of storage or transportation of polypropylene pellet, due to removal of a flake-like floss. The separation efficiency i.e. percentage of caught floss in the above Table is very high in terms of separation efficiency obtained by separation by means of a separator as in the present invention, which can separate a slight amount of floss contained in a large amount of pellet therefrom in spite of a simple structure and without requiring a secondary air, and it is possible to fully satisfy process requirements concerning polypropylene pellet and its use.

What is claimed is:

1. A floss separator consisting of a generally vertical lower cylindrical column and a cylindrical upper chamber connected directly to the upper part of said column and having a larger diameter than that of said column and a gas outlet in the upper part of said chamber; said vertical type lower cylindrical column having
   (a) an inlet pipe fixed in the lower outer surface of said column and inclined laterally thereto, for causing a mixture of air or nitrogen gas with entrained thermoplastic resin pellets to flow into the bottom of said column through the inlet and to form a helical ascending gas stream of said mixture in said column,
   (b) a discharging port provided below said inlet for discharging a thermoplastic resin pellet separated from said mixture; and
   (c) a blow-through part for gas current in the upper part of said column, said blow-through part comprising a plurality of baffles fixed onto the inner wall of said column at the uppermost part thereof, and the upper end part of said column,
   (d) said plurality of baffles
   (i) being counter-radially protruded from the inner wall of said column toward the axis of said column and
      (ii) each baffle having an angle of attack of 0° to 90° to the path of said helical ascending gas current, and also
      (iii) a sweptback angle of 0° to 30° to said gas current line at the lower margin of said baffles,
      (iv) at least the tip ends of at least two of said baffles partly overlapping with each other on a plan view of said blow-through part.

2. A floss separator according to claim 1 wherein the number of said plurality of baffles is between 2 and 32.

3. A floss separator according to claim 1 wherein the ratio of the area of said blow-through part in the horizontal cross-section of said column on the level of the upper end of said blow-through part, to the area of horizontal cross-section is 0.1 to 0.9.

4. A floss separator according to claim 1 wherein the axis of said inlet has an upward angle of 3° to 30°.

5. A floss separator according to claim 1 wherein the horizontal component of the axial line of said inlet is tangential to the horizontal cross-section of said column.

6. A method for separating floss from thermoplastic resin pellets containing floss which comprises:
   (a) tangentially introducing floss-containing pellets carried in a gas stream adjacent the bottom of an elongated vertical separation zone,
   (b) causing said introduced gas stream and pellets to flow upwardly through the entire cross section of said elongated separation zone in the general path of an upward helix,
   (c) near the top of said separation zone breaking said upwardly moving helical flow patterns of the stream of gas and pellets by collision with baffles disposed at an angle to the axis of the separation zone so that the pellets will drop downwardly after collision and at least a large portion of the floss will not drop downwardly, and
   (d) removing de-flossed pellets adjacent the lower part of the separation zone and removing the gas stream at a point beyond the baffles.

* * * * *